US008652333B2

United States Patent
Nicoll

(10) Patent No.: US 8,652,333 B2
(45) Date of Patent: Feb. 18, 2014

(54) SOLVENT REMOVAL

(75) Inventor: Peter Nicoll, Guildford (GB)

(73) Assignee: Surrey Aquatechnology Limited, Guildford, Surrey (GB)

(*) Notice: Subject to any disclaimer, the term of this patent is extended or adjusted under 35 U.S.C. 154(b) by 280 days.

(21) Appl. No.: 13/132,826

(22) PCT Filed: Dec. 8, 2009

(86) PCT No.: PCT/GB2009/002846
§ 371 (c)(1),
(2), (4) Date: Jun. 3, 2011

(87) PCT Pub. No.: WO2010/067065
PCT Pub. Date: Jun. 17, 2010

(65) Prior Publication Data
US 2012/0279921 A1 Nov. 8, 2012

(30) Foreign Application Priority Data
Dec. 8, 2008 (GB) .................................. 0822362.0

(51) Int. Cl.
*B01D 11/00* (2006.01)
*B01D 61/00* (2006.01)
*C02F 1/44* (2006.01)

(52) U.S. Cl.
USPC ............... 210/644; 203/10; 203/12; 203/39; 210/641; 210/650; 210/652; 210/702; 210/774; 210/805; 210/806; 423/499.4; 423/499.5

(58) Field of Classification Search
USPC ......... 210/634, 637–639, 641, 644, 649–652, 210/702, 774, 805, 806; 423/499.4, 499.5; 203/10, 12, 39
See application file for complete search history.

(56) References Cited

U.S. PATENT DOCUMENTS

| | | | |
|---|---|---|---|
| 6,391,205 B1 * | 5/2002 | McGinnis | 210/644 |
| 6,841,074 B2 * | 1/2005 | Mobius et al. | 210/641 |
| 7,560,029 B2 * | 7/2009 | Mc Ginnis | 210/644 |
| 7,879,243 B2 * | 2/2011 | Al-Mayahi et al. | 210/652 |
| 8,029,671 B2 * | 10/2011 | Cath et al. | 210/321.64 |
| 8,083,942 B2 * | 12/2011 | Cath et al. | 210/321.6 |
| 2007/0278153 A1 * | 12/2007 | Oriard et al. | 210/637 |

FOREIGN PATENT DOCUMENTS

WO  2006047577 A1  5/2006

* cited by examiner

*Primary Examiner* — Joseph Drodge
(74) *Attorney, Agent, or Firm* — Whyte Hirschboeck Dudek S.C.

(57) ABSTRACT

A process for removing a solvent from a source solution, said process comprising a) contacting the source solution with one side of a selectively permeable membrane, b) contacting a draw solution having a higher osmotic pressure (higher solute concentration) than the source solution with the opposite side of the membrane, such that solvent from the source solution passes across the membrane to dilute the draw solution by direct osmosis, c) removing solvent from the diluted draw solution to regenerate the draw solution, and d) recycling the regenerated draw solution to step a), characterized in that a portion of the draw solution is discarded or treated before and/or after the draw solution is regenerated in step c) so as to reduce the concentration of any solute species present in the draw solution from the source solution.

13 Claims, 2 Drawing Sheets

SOLVENT REMOVAL

Figure 1:
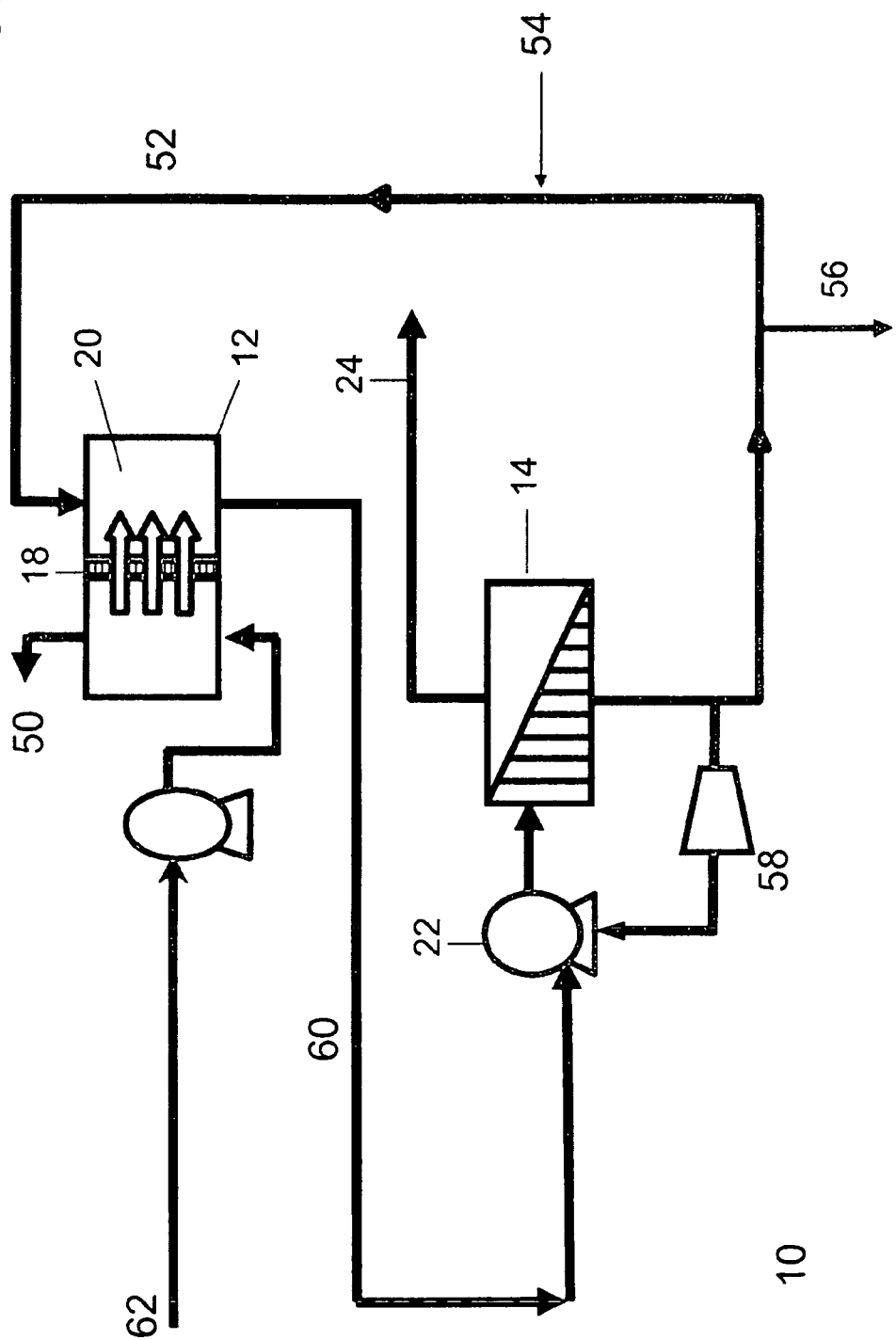

The present invention relates to a process for removing a solvent, such as water, from a source solution.

WO 2005/012185 describes a process for removing a solvent from solution, for instance for separating water from seawater, although not exclusively. The process involves positioning a semi-permeable membrane between the first solution, which may be seawater and a second solution having a higher osmotic potential than the first. The difference in solute concentrations (osmotic potential) causes the solvent from the first solution to flow across the membrane to dilute the second solution by direct osmosis. The diluted second solution is then passed through a nanofiltration or reverse osmosis membrane. The relatively large species in the second solution are retained by the nanofiltration membrane or reverse osmosis membrane, while water passes through the nanofiltration membrane or reverse osmosis membrane.

Although the separation process described in WO 2005/012185 is effective, it has been found that some solute species from the first solution flows across the membrane into the second solution in the direct osmosis step. These species may affect the osmotic pressures of both the diluted and concentrated second solutions and furthermore a portion may be retained within the concentrated second solution following treatment in the nanofiltration or reverse osmosis membrane. The retention of these species from the first solution within the recirculating second solution, affects the stability of the process and these species may be undesirable from a corrosion perspective, increasing osmotic pressure or concentration of the species beyond that desired and may adversely affect the solvent produced from the second solution via the nanofiltration or reverse osmosis step, particularly, if present above threshold concentrations.

According to the present invention, there is provided a process for removing a solvent from a source solution, said process comprising a) contacting the source solution with one side of a selectively permeable membrane, b) contacting a draw solution having a higher osmotic pressure (higher solute concentration) than the source solution with the opposite side of the membrane, such that solvent from the source solution passes across the membrane to dilute the draw solution by direct osmosis, c) removing solvent from the diluted draw solution to regenerate the draw solution, and d) recycling the regenerated draw solution to step a), characterised in that a portion of the draw solution is discarded or treated before and/or after the draw solution is regenerated in step c) so as to reduce the concentration of any solute species present in the draw solution from the source solution.

The source solution may be any solution, such as an aqueous solution. Preferably, the source solution is an aqueous solution of sodium chloride. Examples of suitable source solutions include seawater and brackish water. Other examples include waste water streams, lake water, river water and pond water.

In step a), the source solution is contacted with one side of a selectively permeable membrane. A draw solution having a higher solute concentration than the source solution is contacted with the opposite side of the membrane, such that solvent (liquid solvent) flows across the membrane by direct osmosis.

The draw solution is preferably formed by dissolving an osmotic agent in a solvent, such as water. By forming the draw solution using one or more selected solutes, a relatively clean solution may be produced. Preferably, the selected osmotic agent is one that can be conveniently separated from the draw solution, for example, by thermal or membrane methods or chemical precipitation and filtration or thermal decomposition or a combination of these. More preferably, the osmotic agent is one that is non-corrosive.

Suitable salts for use as the osmotic agent include magnesium sulfate ($MgSO_4.6H_2O$ or $MgSO_4.7H_2O$), magnesium chloride ($MgCl_2.6H_2O$), sodium chloride (NaCl), sodium sulfate ($Na_2SO_4.10H_2O$), calcium chloride ($CaCl_2.2H_2O$ or $CaCl_2.6H_2O$), Borax ($Na_2B_4O_7$) disodium hydrogenphosphate ($Na_2HPO_4.12H_2O$), potassium alum ($KAl(SO_4)_2.12(H_2O)$), ammonium carbonate (($NH_4)_2CO_3$), ammonium bicarbonate ($NH_4HCO_3$), ammonium carbamate ($NH_2COONH_4$). In a preferred embodiment, magnesium sulphate is used.

The draw solution may additionally contain additives, such as anti-scaling, anticorrosion, pH-regulating and/or anti-microbial agents.

The draw solution may have an initial solute concentration, such that the osmotic pressure of the concentrated draw solution is greater than the source solution, preferably of at least 3 weight %, or more preferably at least 5 weight %, prior to contact with the selective membrane in the direct osmosis step. The draw solution may have an initial solute concentration or osmotic pressure that is at least 50% more than the osmotic pressure of the source solution. The initial solute concentration of the draw solution may be tailored depending on the initial solute concentration of the source solution. For example, if the source solution is seawater, the draw solution may be made, such that it has an initial solute concentration that is higher (e.g. by at least 10%, preferably at least 30%) than that of seawater to ensure that water can flow across the membrane to dilute the draw solution by direct osmosis.

The selectively permeable membrane employed in the direct osmosis step may have an average (e.g. mean) pore size of 0.5 to 80 Angstroms, preferably, 2 to 50 Angstroms. In a preferred embodiment, the membrane has an average (e.g. mean) pore size of from 3 to 30 Angstroms. Pore size (e.g. mean pore size) may be measured using any suitable technique. For example, a differential flow method may be employed (Japan Membrane Journal, vol. 29; no. 4; pp. 227-235 (2004)).

Suitable selectively permeable membranes for the direct osmosis step include integral membranes and composite membranes. Specific examples of suitable membranes include membranes formed of cellulose acetate (CA) and/or cellulose triacetate (CTA), such as or similar to those used in the study of McCutcheon et al., Desalination 174 (2005) 1-11 and membranes formed of polyamide (PA). An array of membranes may be used.

The selectively permeable membrane may be planar or take the form of a tube or hollow fibre. For example, a tubular configuration of hollow fine fibre membranes may be used. If desired, the membrane may be supported on a supporting structure, such as a mesh support. When a planar membrane is employed, the sheet may be rolled such that it defines a spiral in cross-section. When a tubular membrane is employed, one or more tubular membranes may be disposed within a housing or shell. The membrane may also be of the submerged type, taking the form of a flat sheet/planar membrane or may be constructed from tubular or hollow fibres.

The direct osmosis step may be carried out at a pressure of 1 to 40 bar, preferably 2 to 20 bar. Because solvent flows across the selective membrane by direct osmosis, the draw solution becomes pressurised by the influx of solvent. This pressure may be used to generate or supplement the pressure required for any subsequent processing steps.

As mentioned above, solvent passes across the selectively permeable membrane to dilute the draw solution by direct osmosis. Solvent is then recovered from the diluted draw solution (step c). This solvent recovery step may be carried out by thermal methods. For example, the solvent may be recovered by distilling the diluted draw solution. Suitable distillation techniques are well-known and include multi-stage flash distillation, multi-effect distillation (MED), mechanical vapour compression, MED-thermo compression and rapid spray distillation. Thermal decomposition methods may also be employed.

Solvent may also be removed from the diluted draw solution by membrane methods, such as reverse osmosis or nanofiltration.

Solvent may also be partially removed from solutes by chemical precipitation and filtration and may also be removed by heating and decomposing the solutes, such that a portion of the solvent remains. The solutes and their decomposed species may then be re-introduced into a portion of recycled solvent for re-use as the concentrated draw solution.

Where a membrane method is employed in step c), the diluted draw solution may be passed through a selectively permeable membrane. The selectively permeable membrane employed in step c) may have an average (e.g. mean) pore size of 0.5 to 80 Angstroms, preferably, 2 to 50 Angstroms. In a preferred embodiment, the membrane has an average (e.g. mean) pore size of from 3 to 30 Angstroms. Pore size (e.g. mean pore size) may be measured using any suitable technique. For example, a differential flow method may be employed (Japan Membrane Journal, vol. 29; no. 4; pp. 227-235 (2004)).

Suitable selectively permeable membranes for step c) include integral membranes and composite membranes. Specific examples of suitable membranes include membranes formed of cellulose acetate (CA) and/or cellulose triacetate (CTA), such as or similar to those used in the study of McCutcheon et al., Desalination 174 (2005) 1-11 and membranes formed of polyamide (PA). An array of membranes may be employed.

The membrane used in step c) may be planar or take the form of a tube or hollow fibre. For example, a tubular configuration of hollow fine fibre membranes may be used. If desired, the membrane may be supported on a supporting structure, such as a mesh support. When a planar membrane is employed, the sheet may be rolled such that it defines a spiral in cross-section. When a tubular membrane is employed, one or more tubular membranes may be disposed within a housing or shell.

Where solvent is removed from the diluted draw solution by reverse osmosis, the membrane used may have a pore size of 1 to 10 Angstroms. The reverse osmosis step may be carried out at an elevated pressure to drive the (liquid) solution through the membrane. For example, the reverse osmosis step may be carried out at a pressure of 25 to 120 bar, preferably 50 to 100 bar, more preferably 60 to 80 bar.

Where solvent is removed from the diluted draw solution by nanofiltration, the membrane employed in the nanofiltration step may have an average (e.g. mean) pore size of 4 to 80 Angstroms. Preferably, the average (e.g. mean) pore size of the membrane is 20 to 70 Angstroms, more preferably 30 to 60 Angstroms, and most preferably 40 to 50 Angstroms. Pore size (e.g. mean pore size) may be measured using any suitable technique. For example, a differential flow method may be employed (Japan Membrane Journal, vol. 29; no. 4; pp. 227-235 (2004)).

The membranes used in the nanofiltration step may be cast as a "skin layer" on top of a support formed, for example, of a microporous polymer sheet. The resulting membrane may have a composite structure (e.g. a thin-film composite structure). Typically, the separation properties of the membrane are controlled by the pore size and electrical charge of the "skin layer".

Examples of suitable nanofiltration membranes include Desal-5 (Desalination Systems, Escondido, Calif.), SR 90, NF 90, NF 70, NF 50, NF 40, NF 40 HF membranes (FilmTech Corp., Minneapolis, Minn.), SU 600 membrane (Toray, Japan) and NRT 7450 and NTR 7250 membranes (Nitto Electric, Japan).

The nanofiltration membrane may be planar or take the form of a tube or hollow fibre. For example, a tubular configuration of hollow fine fibre membranes may be used. If desired, the membrane may be supported on a supporting structure, such as a mesh support. When a planar membrane is employed, the sheet may be rolled such that it defines a spiral in cross-section. When a tubular membrane is employed, one or more tubular membranes may be disposed within a housing or shell. The solution may be introduced into the housing, whilst the solvent may be removed as a filtrate from the tubes or vice-versa.

The nanofiltration step may also be carried out at an elevated pressure. For example, the nanofiltration step may be carried out at a pressure of 25 to 120 bar, preferably 40 to 100 bar, more preferably 50 to 80 bar. As mentioned above, solution from the retentate-side of the selective membrane of the reverse osmosis step is passed through the nanofiltration membrane. Since this solution is on the high pressure side of the membrane, it may not be necessary to apply further pressure to the solution as it passes through the nanofiltration membrane. However, it is possible to apply further pressure to the solution as it passes through the nanofiltration membrane, if desired.

Preferably, sufficient solvent is removed from the draw solution in part c) to ensure that the regenerated draw solution has a sufficiently high concentration of solvent to draw solvent from the source solution by direct osmosis in step a). The regenerated draw solution is then recycled to step a) in step d).

As well as solvent, solute from the source solution may also flow across the membrane in the direct osmosis step. For example, where an aqueous sodium chloride solution is used as a source solution, sodium chloride may flow across the membrane into the draw solution. This sodium chloride may be difficult to remove in subsequent processing steps. For example, where membrane methods are used to recover the solvent in step c), the presence of solutes, such as sodium chloride, may require smaller pore membranes to be employed and/or greater pressures to be used. Furthermore, the sodium chloride is corrosive and may cause damage to the process equipment.

To prevent the undesirable accumulation of any solutes, such as sodium chloride or boron, a portion of the draw solution is discarded or treated before and/or after the draw solution is regenerated in step c) so as to reduce the concentration of any solute species present in the draw solution from the source solution. In one embodiment, a portion of the draw solution is treated to separate undesirable solutes, such as sodium chloride or boron, from the solution and the remaining solution is then returned to the process. Preferably, however, a portion of the draw solution is discarded. To minimise the amount of desirable solvent discarded with the undesirable solute, the portion of the draw solution is discarded after the draw solution is regenerated in step c) but before the regenerated solution is recycled to the direct osmosis step.

Discarding or treating a portion of the draw solution before and/or after the draw solution is regenerated in step c) so as to reduce the concentration of any solute species present in the draw solution from the source solution results in the total amount of any solute species present in the draw solution being reduced. Thus, the total amount of solute species which may be recycled into the draw solution will be reduced. Therefore, the amount of solute species which are brought into contact with the membrane in step (b) is reduced and also therefore the concentration of solute species brought into contact with the membrane via the recycling process in step (c) may also be reduced.

The present invention may provide a process for removing a solvent from a source solution, said process comprising a) contacting the source solution with one side of a selectively permeable membrane, b) contacting a draw solution having a higher osmotic pressure (higher solute concentration) than the source solution with the opposite side of the membrane, such that solvent from the source solution passes across the membrane to dilute the draw solution by direct osmosis, c) removing solvent from the diluted draw solution to regenerate the draw solution, and d) recycling the regenerated draw solution to step a), characterised in that a portion of the draw solution is discarded or treated before and/or after the draw solution is regenerated in step c) so as to reduce the total quantity of solute species in the draw solution from the source solution.

A portion of the draw solution may be discarded or treated before the draw solution is regenerated in step c) (i.e. when solvent is removed from the diluted draw solution to regenerate the draw solution). In this case, it is the diluted draw solution which is discarded or treated. After a portion of the diluted draw solution has been discarded or treated, solvent is removed from the remaining diluted solution for recycling into one side of the membrane in step (a). The total amount of any solute species present in the draw solution to be recycled (reintroduced to contact the membrane) is lower than before a portion was discarded or treated. Thus, the total amount of solute species which may be recycled into the draw solution is reduced. Therefore, the total amount of solute species which may come into contact with the membrane via the recycling process is reduced.

A portion of the draw solution may be discarded or treated after the draw solution is regenerated in step c) (i.e. when solvent has been removed from the diluted draw solution to regenerate the draw solution). In this case, it is the more concentrated (comprising less solvent) draw solution which is discarded or treated. After a portion of the more concentrated draw solution has been discarded or treated, and it is recycled to one side of the membrane in step (a). The total amount of any solute species present in the total draw solution which may come into contact with the membrane is lower than it would have been had a portion of the draw solution not been discarded or treated. Thus, the total amount of solute species which may be recycled into the draw solution is reduced. Thus, the total amount and therefore concentration of solute species which may come into contact with the membrane via the recycling process is reduced.

Preferably, the portion of the draw solution discarded before and/or after the draw solution is regenerated in step c) so as to reduce the concentration of any solute species present in the draw solution from the source solution is discarded as a bleed from the draw solution. Preferably, a portion of the draw solution is discarded and/or bled in a continuous process. Preferably a portion of the draw solution is discarded and/or bled in a continuous process at a rate determined from the quantity of solvent produced in step (b), the rate of transfer of the target species from the source solution to the draw solution and the rate of transfer of the target species to the solvent produced in step (c).

It will be understood that not all of the draw solution will be removed from the process during the discarding step/bleeding step.

If necessary, additional draw solution which is not part of the recycling process may be added into the process. The additional draw solution may comprise additional osmotic agents.

A portion of the draw solution may be discarded as a continuous bleed from the draw solution. Additional (fresh) draw solution may be added as a continuous feed into the draw solution.

Figure 2:
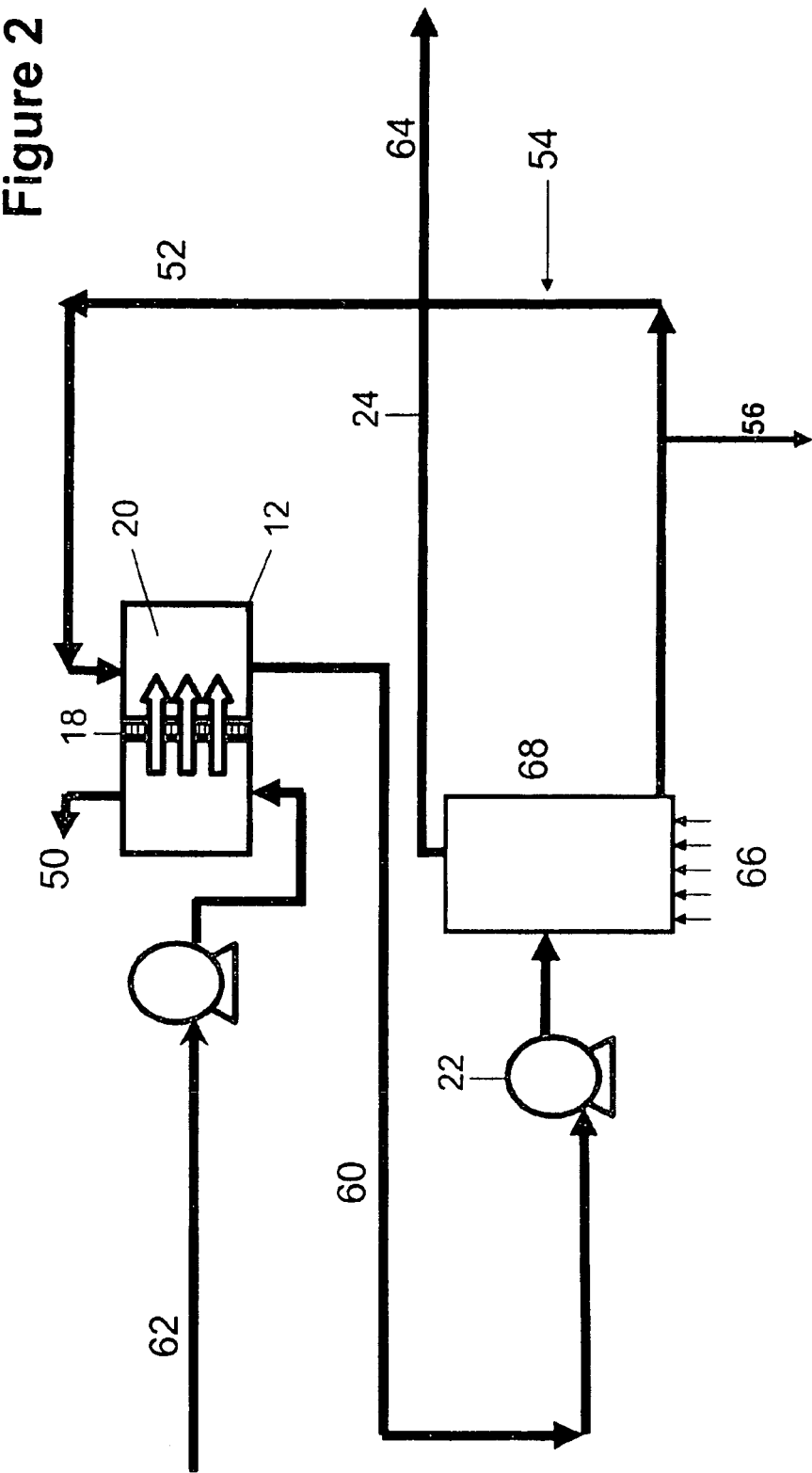

These and other aspects of the invention will now be described with reference to the accompanying Figures, in which:

FIG. 1 is a schematic diagram of an apparatus for carrying out an embodiment of the process of the present invention, and FIG. 2 is a schematic diagram of an apparatus for carrying out an alternative embodiment of the process of the present invention.

The numbering used in FIGS. 1 and 2 relate to the following features:

10 Apparatus
12 Direct Osmosis Unit
14 Membrane Unit
18 Selective Membrane
20 Draw Solution
22 Pump
24 Permeate or Distillate
50 Higher Salinity Seawater (return to sea or reuse)
52 Osmotic agent solution
54 Osmotic agent dosing
56 Bleed/blowdown stream to discharge or treatment for disposal or re-introduction to osmotic agent stream
58 Energy recovery system
60 Osmotic agent solution
62 Source Water e.g sea water
64 Distillate Water
66 Heat
68 Thermal Concentration Unit (ie MSF Plant)

FIG. 1 depicts an apparatus comprising a direct osmosis unit 12 and a membrane unit 14.

The direct osmosis unit 12 is optionally coupled to a container of seawater (not shown). The seawater may optionally be treated with anti-scaling and antimicrobial agents in a pre-treatment unit (not shown). The treated seawater is then introduced into the directed osmosis unit 12 and contacted with one side of a selective membrane 18. A draw solution 20 is contacted with the opposite side of the selective membrane 18. As the initial solute concentration and osmotic pressure of the draw solution 20 is greater than the solute concentration and osmotic pressure of the seawater, liquid water flows across the membrane 18 to dilute the draw solution 20 by direct osmosis. Sodium chloride and other species in the seawater may also flow across the membrane 18 in this direct osmosis step. Accordingly, the diluted draw solution emerging from the osmosis unit 12 includes sodium chloride and other species from the seawater.

The diluted draw solution is introduced into the membrane unit 14 and passed through the membrane at elevated pressures of 60 to 100 bar. The pressure required for this membrane separation step is provided in part by the flux of water flowing across the membrane 18 in the direct osmosis step and in part by the pump 22.

The membrane separates the sodium chloride and other species from the seawater and the osmotic agent from the remainder of the solution. The separated osmotic agent, sodium chloride and other species from the seawater (not removed during this step) form part of a residual solution on the retentate-side of the membrane. To prevent the concentration of sodium chloride and/or other species such as boron from reaching undesirable levels, a portion of this residual solution is bled as it emerges from the membrane unit 14. This bleed may be controlled manually or automatically by reference to the composition of the solution. The remaining residual solution is then recycled for use as the draw solution in the direct osmosis step. Additional osmotic agent may be dosed into the remaining residual solution.

The permeate emerging from the membrane unit 14 is substantially pure and may be used for example as potable water 24.

FIG. 2 is a schematic diagram of an apparatus for carrying out an alternative embodiment of the process of the present invention. The apparatus is similar to that shown in FIG. 1 and like parts have been labelled with like numerals. The membrane unit 14, however, has been replaced by a thermal separation unit. The distillate 24 from the thermal separation unit is potable water, while the residual solution from the base of the unit contains a concentrated solution of osmotic agent, sodium chloride and other species from the seawater. To prevent the concentration of sodium chloride and/or other species such as boron from the seawater from reaching undesirable levels, a portion of this residual solution is bled. This bleed may be controlled manually or automatically by reference to the composition of the solution. The remaining solution is then recycled for use as the draw solution in the direct osmosis step. Additional osmotic agent may be dosed into the remaining residual solution.

The invention claimed is:

1. A process for removing a solvent from a source solution, said process comprising:
   a) preparing a draw solution by dissolving one or more water-soluble salts in water;
   b) contacting the source solution with one side of a selectively permeable membrane;
   c) contacting the draw solution with the opposite side of the membrane, whereas the draw solution is prepared having a higher osmotic pressure (higher solute concentration) than the source solution, such that solvent from the source solution passes across the membrane to dilute the draw solution by direct osmosis;
   d) removing solvent from the diluted draw solution to regenerate the draw solution, and
   e) recycling the regenerated draw solution to step c), wherein
   solute species from the source solution flow across the membrane into the draw solution in the direct osmosis step, and
   a portion of the draw solution is discarded or treated after the draw solution is regenerated in step d), so as to reduce the concentration of solute species present in the draw solution from the source solution.

2. A process as claimed in claim 1, wherein the source solution comprises sodium chloride.

3. A process as claimed in claim 2, wherein the source solution comprises seawater or brackish water.

4. A process as claimed in claim 1, wherein the salt is one or more of magnesium sulfate, magnesium chloride, sodium chloride, sodium sulfate, calcium chloride, Borax, disodium hydrogen phosphate, potassium alum, ammonium carbonate, ammonium bicarbonate and ammonium carbamate.

5. A process as claimed in claim 1, wherein, in step d), solvent is removed from the diluted draw solution by thermal, chemical precipitation, thermal decomposition, membrane methods or a combination of these methods.

6. A process as claimed in claim 1, wherein solvent is removed from the diluted draw solution by distillation.

7. A process as claimed in claim 1, wherein solvent is removed from the diluted draw solution by reverse osmosis or nanofiltration.

8. A process is claimed in claim 1, wherein solvent is removed from the diluted draw solution by chemical precipitation followed by filtration and/or thermal decomposition.

9. A process as claimed in claim 1, wherein a portion of the draw solution is treated after the draw solution is regenerated in step d) so as to reduce the concentration of any solute contaminants present in the draw solution from the source solution.

10. A process as claimed in claim 1, wherein a portion of the draw solution is discarded after the draw solution is regenerated in step d) so as to reduce the concentration of any solute contaminants present in the draw solution from the source solution.

11. A process as claimed in claim 1, wherein said portion of the draw solution is discarded continuously.

12. A process as claimed in claim 11, wherein said portion is discarded in a continuous process at a rate determined from the quantity of solvent produced in step d), the rate of transfer of species from the source solution to the draw solution and the rate of transfer of the species to the solvent produced in step d).

13. A process as claimed in claim 1, wherein the solute species are selected from sodium chloride and boron.

* * * * *